(12) United States Patent
Winkler

(10) Patent No.: US 9,032,890 B2
(45) Date of Patent: May 19, 2015

(54) VESSEL COMPRISING A STOWABLE MAGNUS-EFFECT ROTOR

(76) Inventor: Jørn Paul Winkler, London (GB)

( * ) Notice: Subject to any disclaimer, the term of this patent is extended or adjusted under 35 U.S.C. 154(b) by 141 days.

(21) Appl. No.: 13/579,052

(22) PCT Filed: Feb. 14, 2011

(86) PCT No.: PCT/EP2011/052131
§ 371 (c)(1),
(2), (4) Date: Sep. 25, 2012

(87) PCT Pub. No.: WO2011/098601
PCT Pub. Date: Aug. 18, 2011

(65) Prior Publication Data
US 2013/0032070 A1   Feb. 7, 2013

(30) Foreign Application Priority Data

Feb. 15, 2010  (EP) .................. PCT/EP2010/051857
Sep. 2, 2010   (EP) ..................................... 10175051
Oct. 27, 2010  (EP) ..................................... 10188984

(51) Int. Cl.
B63H 9/02        (2006.01)

(52) U.S. Cl.
CPC .. *B63H 9/02* (2013.01); *Y02T 70/58* (2013.01)

(58) Field of Classification Search
USPC ............................................... 416/4; 114/39.3
See application file for complete search history.

(56) References Cited

U.S. PATENT DOCUMENTS

| 2,082,966 A | * | 6/1937 | Madaras ........................... 416/4 |
| 4,602,584 A | | 7/1986 | North et al. |
| 2009/0241820 A1 | | 10/2009 | Rohden |

FOREIGN PATENT DOCUMENTS

| DE | 255 923 | 4/1988 |
| GB | 2 187 154 | 9/1987 |

OTHER PUBLICATIONS

International Search Report dated Apr. 11, 2011, corresponding to PCT/EP2011/052131.

* cited by examiner

*Primary Examiner* — Edwin Swinehart
(74) *Attorney, Agent, or Firm* — Young & Thompson

(57) ABSTRACT

A vessel includes a hull, a propeller for propulsion of the vessel and at least one rotatable cylinder which in its operational state is vertically mounted on the vessel, the cylinder having a rigid outer surface, a motor drive for rotating the cylinder around a longitudinal axis and a displacement member for displacing the cylinder to an inoperational position, wherein the motor drive is situated inside the cylinder.

9 Claims, 9 Drawing Sheets

VESSEL COMPRISING A STOWABLE MAGNUS-EFFECT ROTOR

FIELD OF THE INVENTION

The invention relates to a vessel comprising a hull, a propeller for propulsion of the vessel and at least one rotatable cylinder which in its operational state is vertically mounted on the vessel, the cylinder having a rigid outer surface, a motor drive for rotating the cylinder around a longitudinal axis and a displacement member for displacing the cylinder to an inoperational position.

BACKGROUND OF THE INVENTION

Such a Magnus-effect rotor is known from U.S. Pat. No. 4,602,584. It has long been known that a circular cylinder rotating about its longitudinal axis is capable of producing a lift force when placed in an air stream flowing perpendicular to the longitudinal axis of the cylinder, quite similar to the lift force produced by a wing when placed in a laminar air flow. This lift force is named after its discoverer, Heinrich Gustav Magnus, the German scientist who first investigated this phenomenon in 1853.

The Magnus-effect was first applied for propelling vessels in 1924 by Anton Flettner. Flettner used elongated cylinder structures, standing upright from the deck of the vessel, for propelling the vessel using the lift force mentioned (these structures were also called: "Flettner-rotors"). The advantage with respect to conventional sails was that the vessel was able to sail at sharper angles with respect to mildly opposing, thus relatively unfavourable, wind directions. Additionally, the Flettner-rotor was able to supplement the propulsion of fuel-powered vessel, thereby decreasing the fuel consumption of such a vessel.

However, in case of strong opposing winds essentially parallel to the desired sailing direction, or in wind conditions with severe gusts, the Flettner-rotor fails to provide any additional propulsion. In these conditions the rotor proves to be a great source of drag to due to the wind hitting the relatively large frontal surface of the rotor. Furthermore, in severe weather conditions with strong winds and high waves, the rotor proves to provide additional instability to the vessel due to the raised centre of gravity.

U.S. Pat. No. 4,602,584 provides a Magnus-effect rotor for use onboard a vessel, which offers the possibility of collapsing the rotor towards the deck, by pivoting it to a position essentially parallel to the longitudinal axis of the vessel, for minimizing the drag on the vessel in such unfavourable wind conditions. More specifically, U.S. Pat. No. 4,602,584 describes an elliptical cylinder, having a major and a minor axis, and a longitudinal axis, upstanding from the deck of the vessel and formed from a rigid outer surface which is rotatable about a central longitudinal axis. The elliptical cylinder can be "parked" in a generally upright position where the cylinder can act as a conventional sail, aligning the minor axis with the wind, or in a position where the elliptical cylinder can be feathered in the wind, aligning the major axis with the wind, thereby reducing drag. Furthermore, during unfavourable wind conditions the elliptical cylinder, or rotor, can be parked in a position where it is essentially parallel to the longitudinal axis of the vessel, thereby not interfering in any way with the manoeuvring or propulsion of the vessel.

However, a Magnus-effect rotor as known from e.g. U.S. Pat. No. 4,602,584 has its motor drive below deck level. Therefore it is relatively hard to access it. Furthermore, a relatively long transmission shaft is needed to transmit the motor drive torque to the rotor cylinder. Also, it is relatively difficult to decouple the rotor from the motor drive.

Another patent publication that describes a stowable rotor is GB 2.187.154. This publication describes a rotor for ship propulsion, which is constructed as a series of cylindrical sections increasing stepwise in diameter from section to section up the height of the rotor so that the rotor can be retracted telescopically into a well in the ship's deck. A central non-rotating support post inside the rotor is fitted with a top bearing that carries the rotor, the post also being telescopic. The topmost rotor section has a boundary layer fence projecting radially around its top end, and the step increase in diameter between each of the sections below and the section above it provides a respective boundary layer fence for the rotor section below in each case. Although this publication allegedly describes a Magnus-effect rotor, no motor drive can be found in the publication for actively rotating the rotor around its longitudinal axis as required for generating the Magnus-effect. Therefore, this publication does in fact not concern a Magnus-effect rotor.

Yet another patent publication that describes a stowable rotor is U.S. Pat. No. 2,596,726. This patent publication describes a wind motor for driving a ship's propeller. More specifically, it describes a motor standing on a bed constructed within the hull of a ship. Stay-lines are employed for keeping the rotor erect relative to the ship. The motor furthermore includes a base plate fastened to the ship's bed by bolts and a mast socketed at its lower end in a boss formed on said base plate, the mast being fitted at its upper end with a spider bracket. The motor further includes a rotor which turns freely around the mast. The rotor comprises a tubular rotor shaft encircling the mast and upper and lower disc-like end plates axially keyed to the rotor shaft. This publication however does not disclose a Magnus-effect rotor, which requires drive means for actively rotating the rotor around its longitudinal axis as required for generating the Magnus-effect. The rotor is actually being used to provide power to the propeller of the ship.

In view of the foregoing, it is therefore an object of the invention to provide a Magnus-effect rotor which can be relatively easily stored onboard a vessel, e.g. during unfavourable wind conditions, while using up a relatively low amount of deck space. It is another object of the invention to provide relatively easy access to the motor drive for maintenance. It is a further object of the invention to shield the motor drive from environmental conditions.

SUMMARY OF THE INVENTION

Thereto, a known vessel with a Magnus-effect rotor is characterised in that the motor drive is situated inside the cylinder. By having the motor drive situated inside the cylinder, the use of deck space is reduced. Furthermore, the motor is shielded from environmental conditions.

In an embodiment the cylinder comprises two or more telescopically connected tubular segments and an extension member situated along the longitudinal axis, attached to at least one of the segments for raising the segment into an operational state in which the extension member is extended and the segments are overlapping with ring-shaped end parts, and for lowering the segment into an inoperational state in which the extension member is retracted and the segments are nested such that their outer surfaces are overlapping.

The telescopically connected tubular segments ensure that the cylinder can be reduced in size conveniently, e.g. when sailing against the wind or during severe weather conditions. An extension member is provided for retracting the tubular segments to an inoperational state, in these conditions, and for extending them into an operational state when wind or weather conditions have improved again. In the inoperational state the outer surfaces overlap, thereby protecting the cylinder from environmental conditions. Due to its reduced size in its inoperational state it is also easier to exchange the cylinder in case of a defect. In case of relatively small defects, where the cylinder does not need to be exchanged, the cylinder is still relatively easy to access for repairs due to its reduced size.

In a further embodiment the lowermost segment is stationary in the vertical direction, the motor drive being situated at a vertical constant position within the lowermost segment. By doing this, the motor drive is relatively easily accessible for repairs.

In another embodiment, the motor drive is movably connected to a segment to be displaceable in a vertical direction together with the segment by the extension member. The motor drive can thus be put at a more beneficial height, for example for reducing vibrations, which are relatively more prevalent when the motor drive is connected to a lower segment.

The cylinder can be advantageously hingeably connected to the vessel around a substantially horizontal hinge line. This allows for saving even more deck space, and for even easier access to the rotor parts.

Also, a known vessel with a Magnus-effect rotor is characterised in that the vessel comprises a motor drive means comprising a transmission device attached to the cylinder and a drive member placed at a distance from the cylinder coupled to the transmission device. Having the drive member on the deck allows for relatively easy access of the motor for maintenance and inspection.

In an embodiment, the transmission device is movable with the cylinder from the operational state and detachably coupled to the transmission device. Thus, the transmission device can move along with the cylinder.

In another embodiment the cylinder comprises two or more telescopically connected tubular segments and an extension member situated along the longitudinal axis, attached to at least one of the segments for raising the segment into an operational state in which the extension member is extended and the segments are overlapping with ring-shaped end parts, and for lowering the segment into an inoperational state in which the extension member is retracted and the segments are nested such that their outer surfaces are overlapping, the transmission device being attached to at least one of the segments to be vertically displaceable by the extension member. Having the transmission device attached to a vertical segment allows for good flexibility for detaching the transmission device and the drive member.

In a further embodiment the cylinder is hingeably connected to the vessel around a substantially horizontal hinge line, the transmission device being hingeable together with the cylinder from the operational to the inoperational state. The hingeability of the cylinder allows for saving even more deck space than with the retractability of the tubular segments alone. Furthermore, the cylinder, as well as the transmission device, are readily accessible for maintenance.

The hingeability of the cylinder can be advantageously established by a rotor support assembly comprising a rotor support frame and a housing hingeably attached to the frame around a transverse axis between a substantially horizontal and a substantially vertical position, the housing supporting the rotatable cylinder. The housing is hingeably attached to the frame, which allows the rotor to be placed in two positions, a substantially vertical position in which the rotor is operational and a substantially horizontal position in which the rotor is inoperational, and kept out of the wind. Furthermore, the housing reduces vibrations of the cylinder while in operation.

Also, the vessel can advantageously be provided with a storage compartment having a length larger than the length of the cylinder, the storage compartment being situated on the deck between two cargo compartments for storing the rotor in its longitudinal position, the storage compartment being provided with doors for opening and closing the storage compartment. The storage compartment allows for storing a hingeable cylinder in the inoperational position, thereby protecting it from environmental conditions. The motor drive can, in the case of the drive member being positioned outside of the rotor, be conveniently protected by the storage box, as to keep its operation reliable.

Furthermore it is advantageous to have the cylinder hingeably attached to a deck of the vessel, the cylinder in its retracted stated being hingeable around a hinge axis for placing its longitudinal axis into a horizontal position. By placing the cylinder with its longitudinal axis into a horizontal position, even less deck space is consumed, and any unwanted drag on the rotor is minimized.

Also, it is advantageous to have an end part of the cylinder be receivable in a cradle on the deck of the vessel, at a distance from the hinge axis which is not larger than the length of the cylinder in its retracted state. By providing a cradle on the deck of the vessel for receiving the cylinder in its retracted state the cylinder can be securely fixed to the deck.

Additionally, it is advantageous to have the cylinder mounted over a receiving chamber in the vessel, the receiving chamber being situated in a cargo compartment or in a space between an inner and an outer wall of the hull, the extension member being adapted for lowering the cylinder into the receiving chamber and for raising the cylinder from the receiving chamber. This provides the advantage of retracting the cylinder below the deck. Moreover, optimal use is made of the area in the hull. Alternatively the cylinder can be stored in the cargo space of the vessel. Both options provide the advantage of having the cylinder out of the way of deck operations. Furthermore, the cylinder is shielded from environmental conditions.

Furthermore, it is advantageous to provide the vessel with a cylindrical receiving chamber, having a peripheral wall of substantially the length of the cylinder in its retracted state. This provides for a dedicated storage space for storing the cylinder, where it is protected from the contents of the hull. Also, the cylinder is protected from the ingress of sea water. Moreover, it provides for an integral unit for exchanging the cylinder in case of defects. The integral unit also provides for the opportunity to have the rotor retrofitted on existing vessels.

Additionally, it is advantageous to provide the cylindrical receiving chamber with a bottom wall. This provides for a sealed-off receiving chamber, where the cylinder is protected from water and contents of the hull.

Also it is advantageous to have the cylinder at its top comprise a circular plate of larger diameter than the cylinder, fixedly attached to the upper tubular segment, the extension member extending from a bottom of the cylinder to the circular plate and being attached to said plate via a bearing to allow rotation of the plate relative to the extension member. This provides the cylinder with the ability to lift the tubular segments during the telescopic movement via the circular top plate.

It is also advantageous to have the lower part of the extension member connected to a cable, which runs over a pulley positioned essentially on top of the displacement member, wherein the cable is connected to a winch for extending and retracting the extension member. This allows for a relatively compact and lightweight design of the extension and retraction mechanism. Of course the extension and retraction mechanism can also be provided with a hydraulic system, or a servo-driven system for displacing the extension member with respect to the displacement member.

Additionally, it is advantageous to provide the inside of the cylinder with a support member positioned along the longitudinal axis of the extension member and displacement member, connecting the extension member and displacement member to the cylinder, thereby providing additional rigidity to the cylinder. The support member comprises a bearing for allowing rotation relative to the extension member and displacement member. The support member can for example comprise a wheel running along the inner circumference of the cylinder. The additional rigidity improves the mechanical reliability of the structure and reduces vibrations.

Also disclosed herein is a vessel comprising a hull, one or more cargo compartments within said hull, a propeller for propulsion of the vessel and at least one rotatable cylinder which in its operational state is vertically mounted on the vessel, the cylinder having a rigid outer surface, a motor drive for rotating the cylinder around a longitudinal axis and a displacement member for displacing the cylinder to an inoperational position, characterised in that the cylinder is mounted over a receiving chamber in the vessel, the receiving chamber being situated in the cargo compartment or in a space between an inner and an outer wall of the hull, the vessel comprising a lifting device for displacing the cylinder in its length direction for lowering the cylinder into the receiving chamber in its inoperational state and for raising the cylinder from the receiving chamber in its operational state.

The lifting device ensures that the cylinder as a whole can be lifted into a receiving chamber in the hull or in the cargo compartment, e.g. when sailing against the wind or during severe weather conditions. This provides for a relatively quick way for removing the cylinder from the deck in these conditions, and for freeing up deck space accordingly. Furthermore, the cylinder is thus shielded from environmental conditions. Additionally, by storing the cylinder in a receiving chamber it is also easier to exchange the cylinder in case of a defect.

It is also advantageous to have a cylindrical receiving chamber, having a peripheral wall, providing for a dedicated storage space for storing the cylinder, where it is relatively protected from the contents of the hull. Also, the cylinder is relatively well-protected from the ingress of sea water. Moreover, it provides for a relatively integral unit for exchanging the cylinder in case of defects.

Additionally, it is advantageous to provide the cylindrical receiving chamber with a bottom wall. This provides for an even more sealed-off receiving chamber, where the cylinder is relatively better protected from sea water and contents of the hull from below.

Moreover, it is advantageous to provide the receiving chamber with a cover member for covering the receiving chamber in a water-tight manner. This provides for the cylinder being relatively well-protected from the ingress of sea water from above. Moreover, it provides for a relatively integral unit for exchanging the cylinder in case of defects.

Furthermore, it is advantageous to have the cylinder at its top comprise a circular plate of larger diameter than the cylinder, where the circular plate forms the cover member. A two-fold advantage is achieved in that the circular plate represents an optimal geometrical shape for preventing voracity at the top of the cylinder in the operational state, as well as forming a cover member for sealing off the inoperational cylinder from the environment, e.g. during stormy weather.

Also it is advantageous to let the motor drive comprise a motor which is fixed to a deck of the vessel or to the receiving chamber and a drive member which is fixed to the rotatable cylinder and which can be displaced into the inoperational state and raised to the operational state together with the cylinder by the lifting device. The drive member for example may comprise gear wheels, or a drive belt. The drive member is lowered and raised along with the cylinder, which allows for easy access of the motor for maintenance and inspection.

Furthermore, it is advantageous to have the cylinder rotated by the motor drive via a drive shaft running essentially parallel to the longitudinal axis of the cylinder. The drive shaft can also be advantageously placed inside the displacement or extension members—in case of a cylinder with telescopic tubular segments—, rotating the cylinder via appropriate means for transmitting the rotational forces of the drive shaft. The drive shaft can also comprise telescopic elements, to allow the drive shaft to extend or retract along with the tubular segments of a cylinder with telescopic segments. The means for transmitting the rotational forces of the drive shaft to the cylinder can advantageously connect to the support member, as to rotate the cylinder via the support member. The means for transmitting the rotational forces of the drive shaft to the cylinder can advantageously comprise a gear wheel or any other type of suitable wheel, such as wheel with friction material on its rim, as to rotate the cylinder via friction. Thus, by using such a drive shaft to rotate the cylinder an even distribution of driving force can be achieved over the cylinder, especially over a cylinder comprising tubular segments, reducing vibrations. The drive shaft itself can be advantageously driven via a drive belt attached to the motor drive.

The motor drive in general can be advantageously placed inside the cylinder, in order to prevent the motor drive from being exposed to the environment. The motor drive can be connected to the inside of the cylinder via any appropriate means for transmitting rotational forces, such as gear wheels, or to the drive shaft, for example via a drive belt or drive chain.

Also disclosed herein is a rotatable cylinder for use in a vessel as mentioned in the foregoing.

BRIEF DESCRIPTION OF THE DRAWINGS

Further objects and advantageous aspects of the invention will be apparent from the claims and the following detailed description of an embodiment of the invention in conjunction with the drawings, in which:

DETAILED DESCRIPTION OF THE INVENTION

Figure 1:
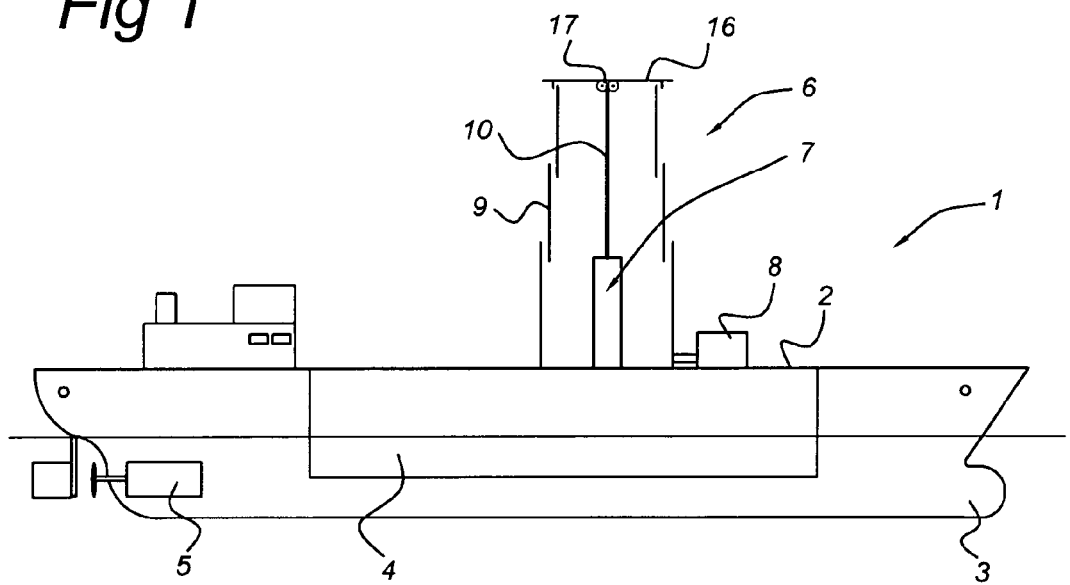
FIG. 1 shows a schematic side view of a vessel equipped with a telescopically retractable rotor in an extended, operational state, according to an embodiment of the invention.

FIG. 1 shows a schematic side view of a vessel equipped with a telescopically retractable rotor in an extended, operational state, according to an embodiment of the invention; the vessel 1 is provided with a cargo compartment 4 for storing cargo. The vessel 1 is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a motor drive 8 for rotating or spinning the rotor 6 to a desired rotational speed. The rotor 6 itself comprises several tubular segments 9. The tubular segments 9 are telescopically fitted into each other, with their longitudinal axes essentially in line with each other and their outer surfaces partly overlapping. Along the longitudinal axis of the rotor 6 a displacement member 7 is placed for extending the rotor 6 to its operational state, and for retracting the rotor 6 to its inoperational state. The displacement member 7 is provided with an extension member 10. The extension member 10 connects to a circular plate 16 on top of the rotor 6. The displacement member 7 can for example comprise a hydraulic cylinder. The circular plate 16 is allowed to have rotational freedom with respect to the extension member 10. This rotational freedom concerns rotation around the longitudinal axis of the extension member 10. The circular plate 16 is provided with bearings 17 to accomplish this. The circular plate 16 furthermore functions as a voracity reduction means with respect to a rotating rotor 6.

Figure 2:
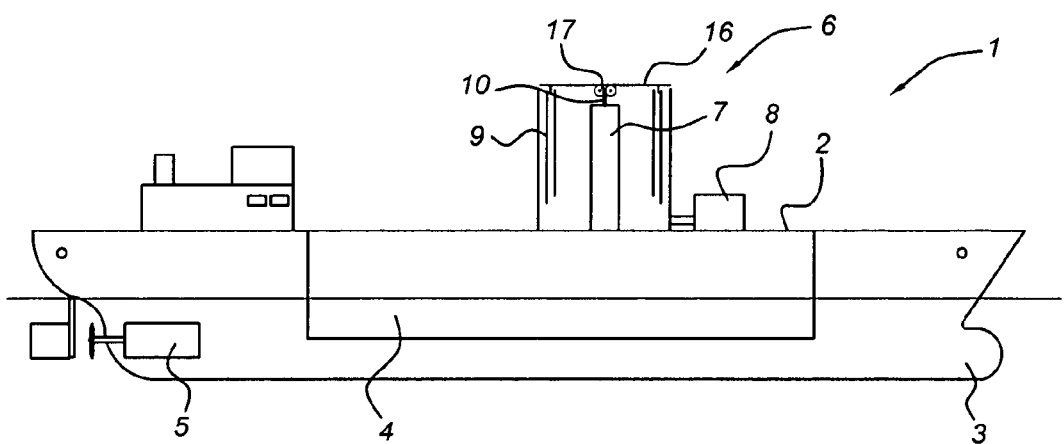
FIG. 2 shows a schematic side view of the vessel equipped with the telescopically retractable rotor, with the rotor in a retracted, inoperational state.

FIG. 2 shows a schematic side view of the vessel equipped with the telescopically retractable rotor, with the rotor in a retracted, inoperational state; again, the figure shows a vessel 1 equipped with a telescopically retractable rotor 6, but now the rotor 6 is shown in a retracted, inoperational state; the vessel 1 is again provided with a cargo compartment 4 for storing cargo. The vessel 1 is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a motor drive 8 for rotating or spinning the rotor 6 to a desired rotational speed. The rotor 6 itself comprises several tubular segments 9. The tubular segments 9 are telescopically fitted into each other, with their longitudinal axes in line with each other. Now the outer surfaces of the tubular segments 9 are almost fully overlapping. Along the longitudinal axis of the rotor 6 a displacement member 7 is placed for extending the rotor 6 to its operational state, and for retracting the rotor 6 to its inoperational state. The displacement member 7 is provided with an extension member 10. The extension member 10 connects to a circular plate 16 on top of the rotor 6. The displacement member 7 can for example comprise a hydraulic cylinder. The circular plate 16 is allowed to have rotational freedom with respect to the extension member 10. This rotational freedom concerns rotation around the longitudinal axis of the extension member 10. The circular plate 16 is provided with bearings 17 to accomplish this. The tubular segments 9 are now nested such that their outer surfaces are overlapping. The circular plate 16 shields the rotor 6 from the environment. The circular plate 16 furthermore functions as a vorticity reduction means with respect to a rotating rotor 6 in its operational, i.e. extended, state.

Figure 3:
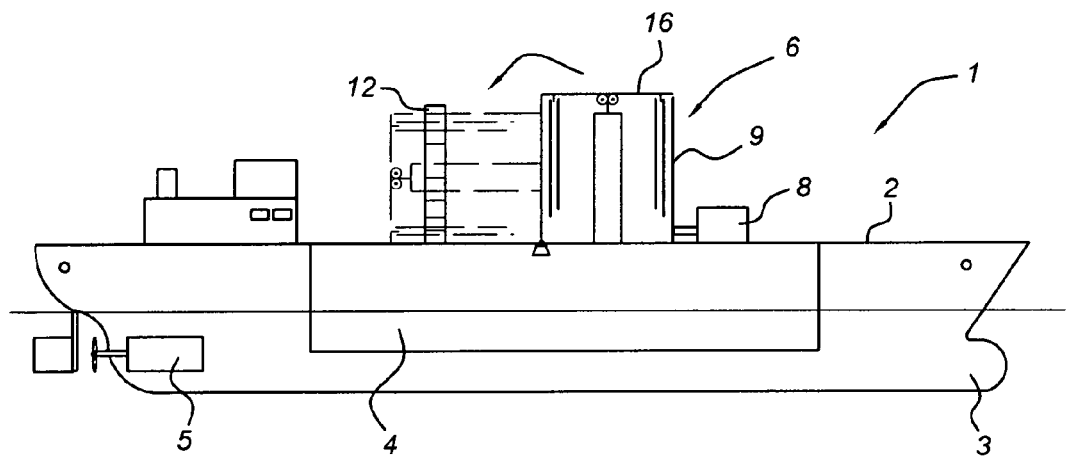
FIG. 3 shows a schematic side view of the vessel equipped with the telescopically retractable rotor in the retracted, inoperational state, wherein the rotor is hingeable around a hinge axis for placing its longitudinal axis into a horizontal position.

FIG. 3 shows a schematic side view of the vessel equipped with the telescopically retractable rotor in the retracted, inoperational state, wherein the rotor is hingeable around a hinge axis for placing its longitudinal axis into a horizontal position; again, the figure shows a vessel 1 equipped with a telescopically retractable rotor 6, with the rotor 6 in a retracted, inoperational state, basically as shown in FIG. 2; the vessel 1 is again provided with a cargo compartment 4 for storing cargo. The vessel is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a motor drive 8 for rotating or spinning the rotor 6 to a desired rotational speed. The rotor 6 itself comprises several tubular segments 9. The tubular segments 9 are telescopically fitted into each other, with their longitudinal axes in line with each other. The tubular segments 9 are nested such that their outer surfaces are overlapping. Along the longitudinal axis of the rotor 6 a displacement member 7 is placed for extending the rotor 6 to its operational state, and for retracting the rotor 6 to its inoperational state. Note that the displacement member 7 is not shown for clarity. On top of the rotor a circular plate 16 is provided for shielding the rotor 6 from the environment. The circular plate 16 furthermore functions as a vorticity reduction means with respect to a rotating rotor 6 in its operational, i.e. extended, state. Also, the rotor 6 is connected to the deck 2 via a hinge 11. The retracted rotor 6 can thus be hinged around a hinge axis for placing its longitudinal axis from an upright position A into a horizontal position B. The rotor 6 can be securely connected to the deck 2 via a cradle 12.

Figure 4:
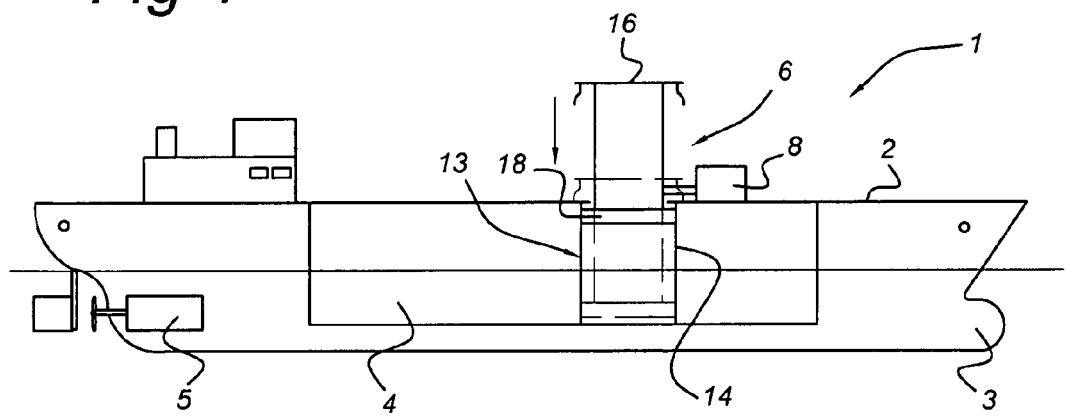
FIG. 4 shows a schematic side view of a vessel equipped with a rotor, wherein the rotor is mounted over a receiving chamber in the vessel.

FIG. 4 shows a schematic side view of a vessel equipped with a rotor, wherein the rotor is mounted over a receiving chamber in the vessel; again, the figure shows a vessel 1 equipped with a rotor 6, but now the rotor 6 comprises only one tubular segment; the vessel 1 is again provided with a cargo compartment 4 for storing cargo. The vessel 1 is also equipped with a propulsion system 5 for propelling the vessel 1. The hull 3 comprises the forementioned cargo compartment 4. The upper part of the hull 3 is formed by the deck 2. The cylindrical rotor 6 is placed on the deck 2. Also situated on the deck 2 is a motor drive 8 for rotating or spinning the rotor 6 to a desired rotational speed. Again a circular plate 16 is provided for shielding the rotor 6 from the environment. The circular plate 16 furthermore functions as a vorticity reduction means with respect to a rotating rotor 6 in its operational, in this case raised, state. The inoperational state is defined by the lowered state, i.e. with the rotor 6 received in the receiving chamber 13. Furthermore FIG. 4 shows the receiving chamber 13, which in this case is provided with a cylindrical peripheral wall 14. A lifting device 18 is provided in the receiving chamber 13 for raising and lowering the rotor 6. Note that the bottom of the receiving chamber 13 is open.

Figure 5:
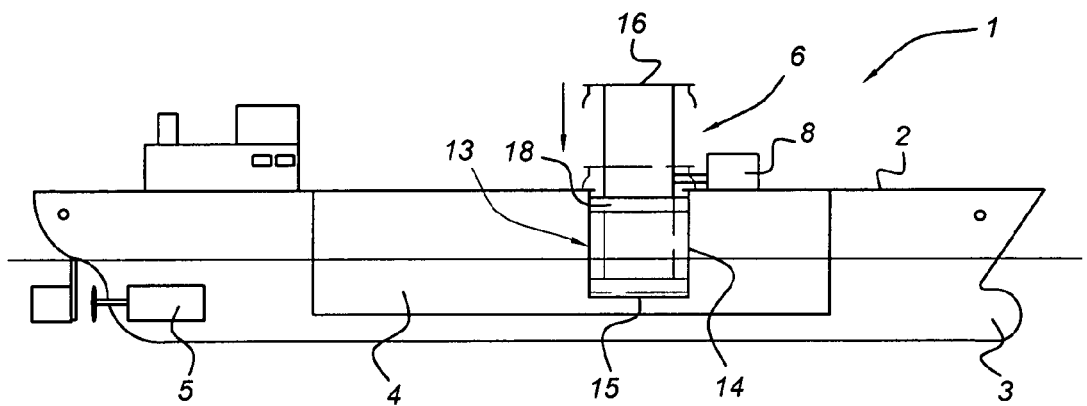
FIG. 5 shows a schematic side view of the vessel equipped with the rotor, wherein the rotor is mounted over the receiving chamber in the vessel, the receiving chamber furthermore comprising a bottom wall.

FIG. 5 shows a schematic side view of the vessel equipped with the rotor, wherein the rotor is mounted over the receiving chamber in the vessel, the receiving chamber furthermore comprising a bottom wall; FIG. 5 is identical to FIG. 4, apart from the receiving chamber 13 being provided with a bottom wall 15.

Figure 6:
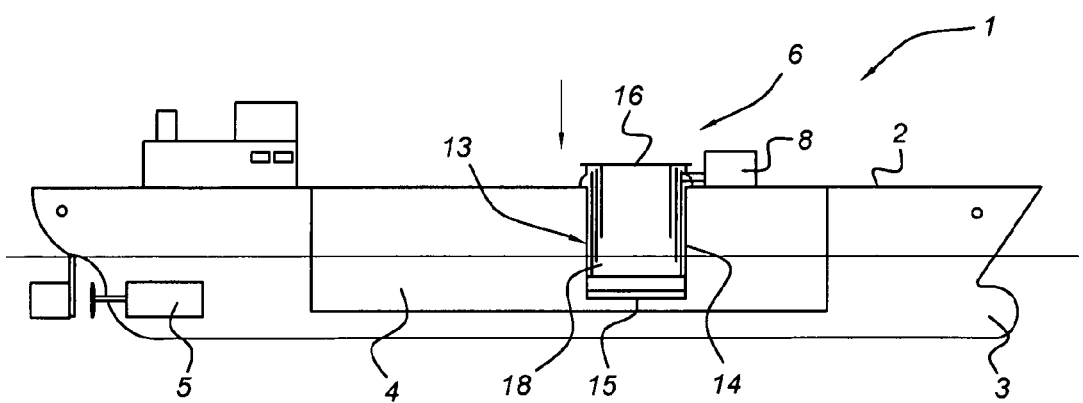
FIG. 6 shows a schematic side view of the vessel equipped with the telescopically retractable rotor, with the rotor in the retracted, inoperational state, wherein the rotor has been lowered into the receiving chamber in the vessel.

FIG. 6 shows a schematic side view of the vessel equipped with the telescopically retractable rotor, with the rotor in the retracted, inoperational state, wherein the rotor has been lowered into the receiving chamber in the vessel; FIG. 6 is basically identical to FIG. 2, apart from the rotor 6 of FIG. 6 being lowered in the receiving chamber 13. Thus FIG. 6 shows a rotor 6 which is both telescopically retractable/extendable, as well as a rotor 6 which can be raised from the receiving chamber 13 towards the deck 2, and which can be lowered into the receiving chamber 13 from the deck 2. The lowered, retracted state of the rotor 6 is shown in FIG. 6.

Figure 7:
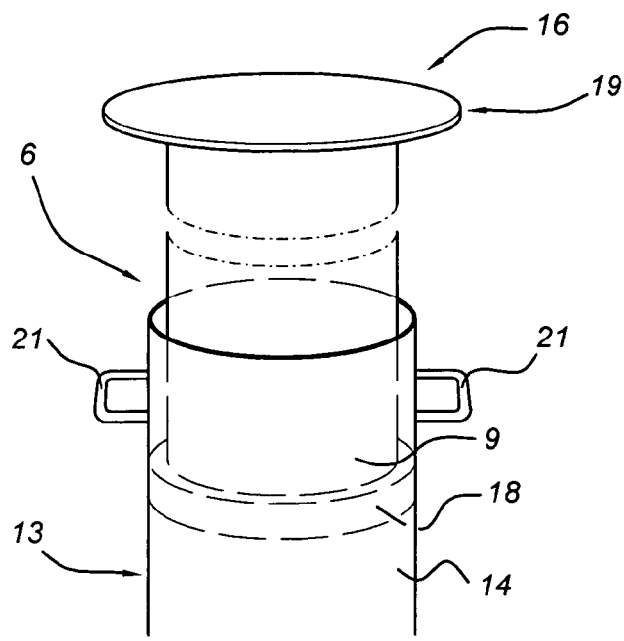
FIG. 7 shows a close-up perspective view of the receiving chamber.

FIG. 7 shows a close-up perspective view of the receiving chamber; the receiving chamber 13 is shown, provided with a cylindrical peripheral wall 14. The rotor 6 of FIG. 6 is also shown, almost fully lowered into the receiving chamber 13. The rotor 6 is again provided with a circular plate 16, with the circular plate 16 also functioning as a cover member 19 for sealing off the receiving chamber 13. The receiving chamber 13 is provided with handles 21 for relatively easy lifting of the receiving chamber 13 with the rotor 6 out of the vessel 1. This provides for relatively easy exchange of the cylindrical receiving chamber 13 with its contents in case of defects. This also provides for relatively easy retrofitting, if desired, of a cylindrical receiving chamber 13 with the rotor 6 in a vessel 1.

Figure 8:
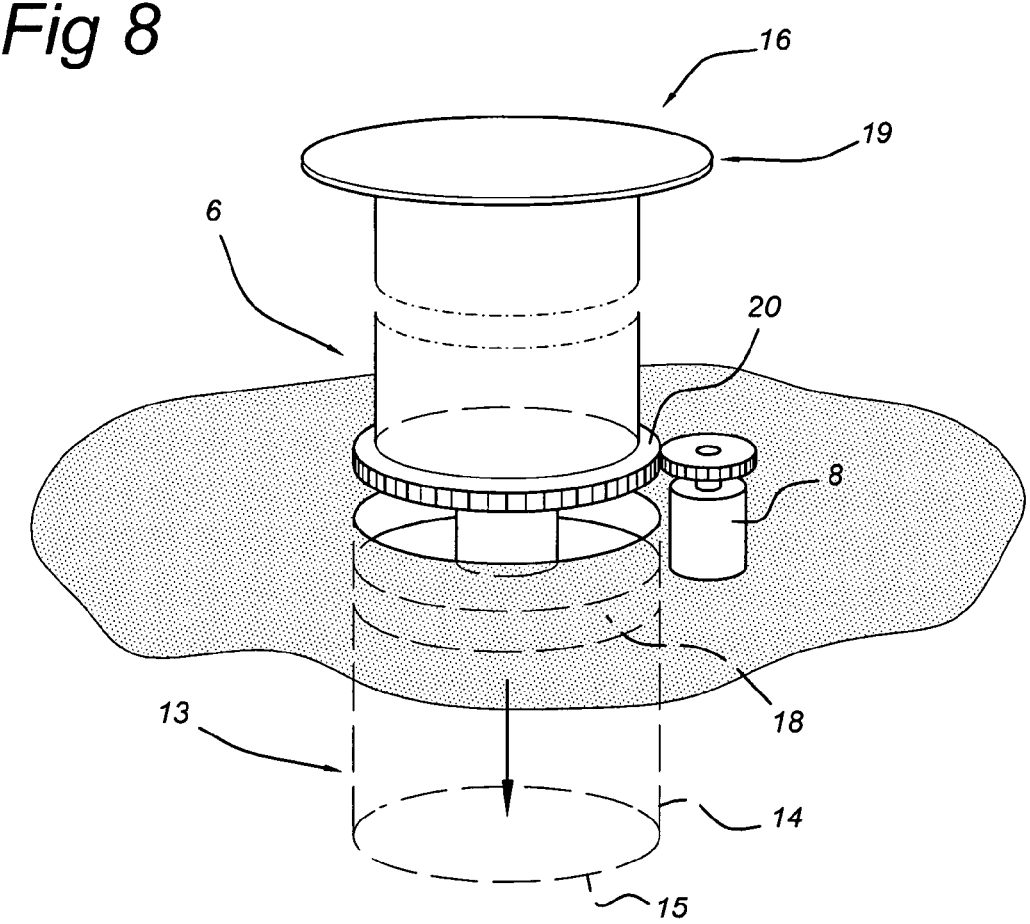
FIG. 8 shows a close-up perspective view of the lower part of the rotor, with a lifting device for lowering the rotor into the receiving chamber.

FIG. 8 shows a close-up perspective view of the lower part of the rotor, with a lifting device for lowering the rotor into the receiving chamber. Basically, FIG. 8 shows the rotor 6 of FIG. 6 or 7 in a close-up view of the lower part of the rotor 6. The rotor 6 is shown in its raised, operational state. With the rotor 6 in its operational state, the motor drive 8 rotate the rotor 6 to a desired rotational speed via a drive member 20. The drive member 20 can e.g. comprise gear wheels, as shown. The gear wheels allow the rotor 6 to relatively quickly disengage from the motor drive 8—e.g. in case of unfavourable wind conditions—and consequently allow the rotor 6 to be lowered into the receiving chamber 13 via the lifting device 18. The receiving chamber 13 is also shown with the bottom wall 15.

Figure 9:
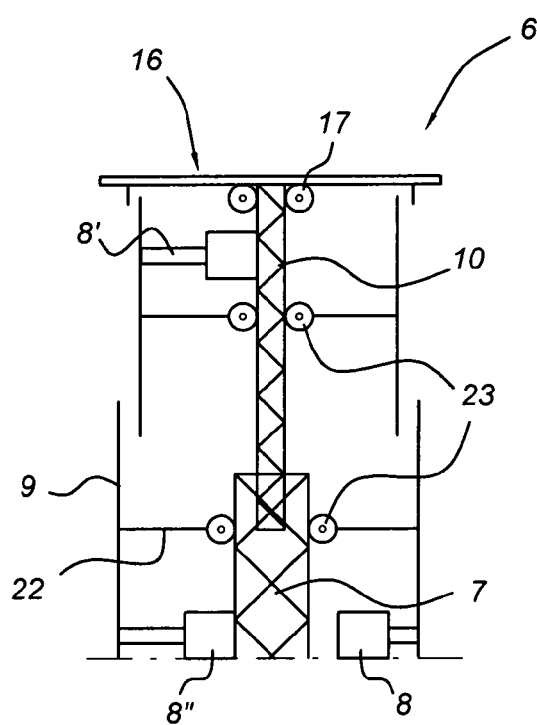
FIG. 9 shows a schematic cross-sectional side view of the cylinder, with support members.

FIG. 9 shows a schematic cross-sectional side view of the cylinder, with support members. FIG. 9 shows the inside of the cylinder 6 provided with two support members 22 positioned along the longitudinal axis of the extension member 10 and displacement member 7, connecting the extension member 10 and displacement member 7 to a tubular segment 9, thereby providing additional rigidity to the cylinder 6. The support member 22 comprises a bearing 23 for allowing rotation relative to the extension member 10 and displacement member 7. Furthermore, FIG. 9 shows the displacement member 7 and extension member 10 advantageously comprising a truss-structure. The truss structure allows for a lightweight yet strong structure for the displacement member 7 and extension member 10. Of course it is also possible to have just the displacement member 7 provided with a truss structure, or just the extension member 10 provided with a truss structure. In a broader sense, a truss structure can also be applied to other parts in the interior of the cylinder 6, such as to the inner surface of the cylinder 6.

Also, FIG. 9 shows the motor drive 8 being positioned inside the cylinder 6 for advantageously protecting the motor drive 8 from the environment. FIG. 9 schematically shows the motor drive 8 connected to the inside of the cylinder 6 for rotating it. FIG. 9 also shows two alternative positions for the motor drive 8, namely 8' and 8". Motor drive 8' is positioned in the uppermost area of the mast 10 while being attached to that mast 10. For driving an upper segment 9. Motor drive 8" is attached to the mast 10, driving the lowermost segment of the cylinder 6.

Figure 10:
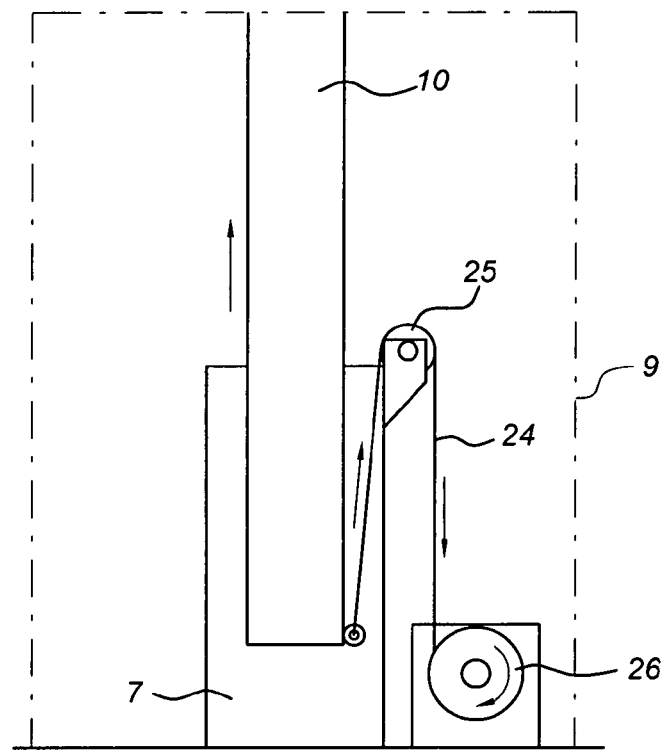
FIG. 10 shows a close-up cross-sectional view of an embodiment of the extension and retraction mechanism.

FIG. 10 shows a close-up cross-sectional view of an embodiment of the extension and retraction mechanism. The lower part of the extension member 10 is connected to a cable 24, which runs over a pulley 25 positioned essentially on top of the displacement member 7, wherein the cable 24 is connected to a winch 26 for extending and retracting the extension member 10.

Figure 11:
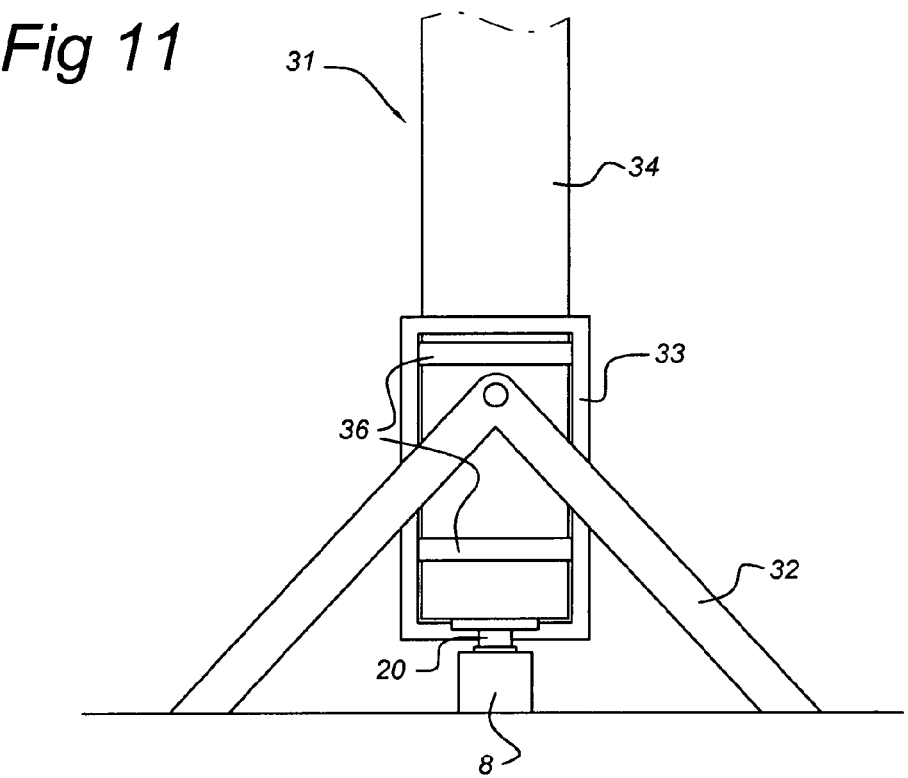
FIG. 11 shows a schematic cross-sectional view of a rotor support assembly according to the invention.

FIG. 11 shows a schematic cross-sectional view of a rotor support assembly according to the invention; rotor support assembly 31 comprising a rotor support frame 32 and a housing 33 hingeably attached to the frame 32 around a transverse axis between a substantially horizontal and a substantially vertical position. The housing 33 is supporting a substantially cylindrical rotor 34 that is rotatable around its centre line. The rotor 34 is mounted in the housing 33 via two bearings 36 at spaced-apart positions along the centre line. The housing 33 is substantially cylindrical and extends along a length of 0.1-0.5, for instance 0.25, times the length of the centre line of the rotor 34. A cylindrical rotor element 47 is mounted on the support member so as to be rotatable around its centre line. The rotor support assembly is shown in its vertical position. The housing 33 comprises a transmission device 20 at its lower side. Furthermore, a motor drive 8 is shown connected to the transmission device 20. The motor drive 8 can, upon rotation of the rotor 34 around its centre line, move along with the housing 33 thereby staying coupled to the transmission device 20. It is also possible to detach the motor drive 8 from the transmission device 20 such that it stays on the deck.

Figure 12:
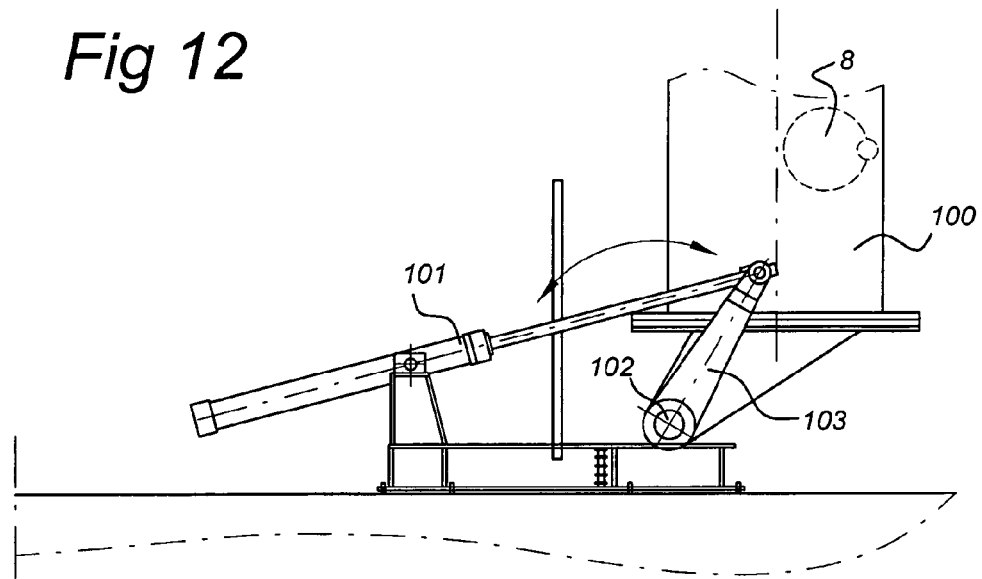
FIG. 12 shows a lifting mechanism for lifting a rotor from a horizontal position to a vertical position.

FIG. 12 shows a lifting mechanism for lifting a rotor from a horizontal position to a vertical position. The lifting mechanism shows an extension mechanism, for instance a hydraulic cylinder 101 fixed to the vessel 1, which is coupled to a lever 103 rotatable around a hinge 102, the lever 103 being rigidly connected to a base plate supporting the rotatable cylinder 6. The lever can also be another construction element suitable for transferring a moment, for instance a bar. Upon extension of the hydraulic cylinder 101 the rotor 100 is transferred to a vertical position, upon retraction of the hydraulic cylinder 101 the rotor is put in a horizontal position. The motor drive 8 is shown inside the cylinder, the motor drive 8 being movable with the cylinder.

Figure 13:
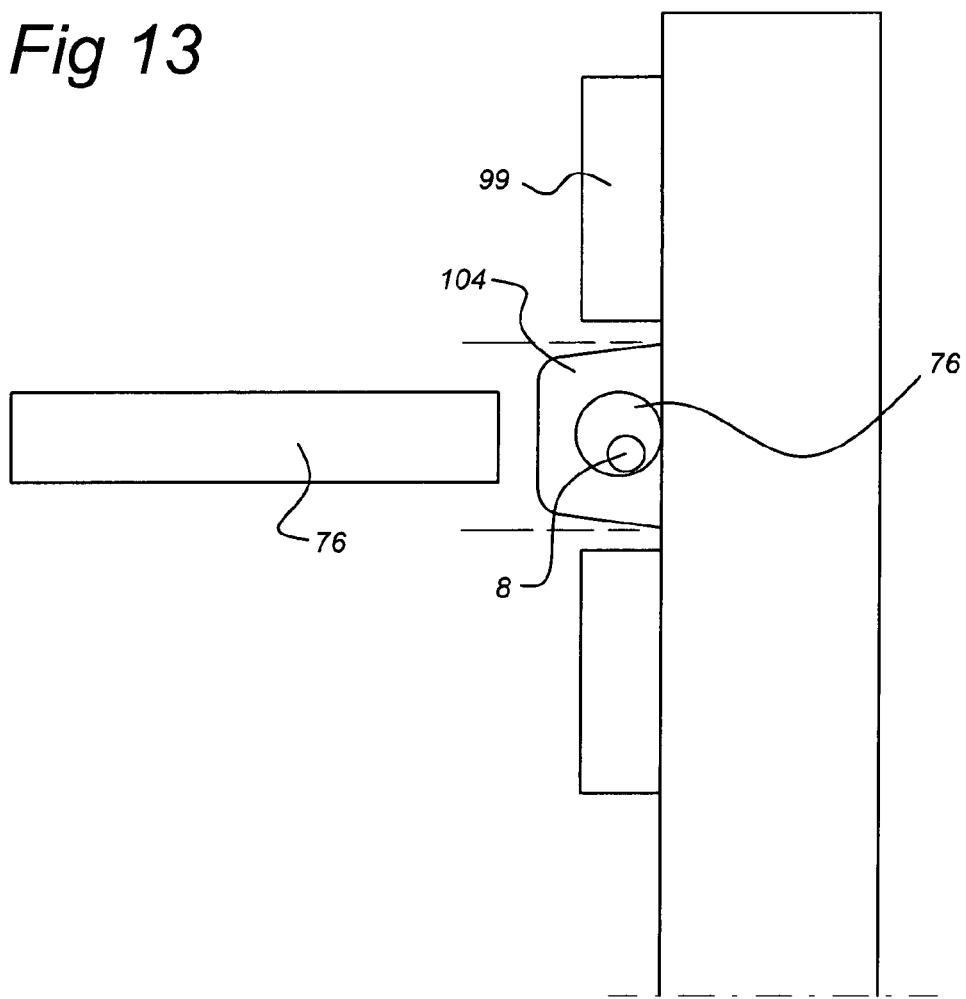
FIG. 13 shows a storage box for storing a rotor.
Figure 14:
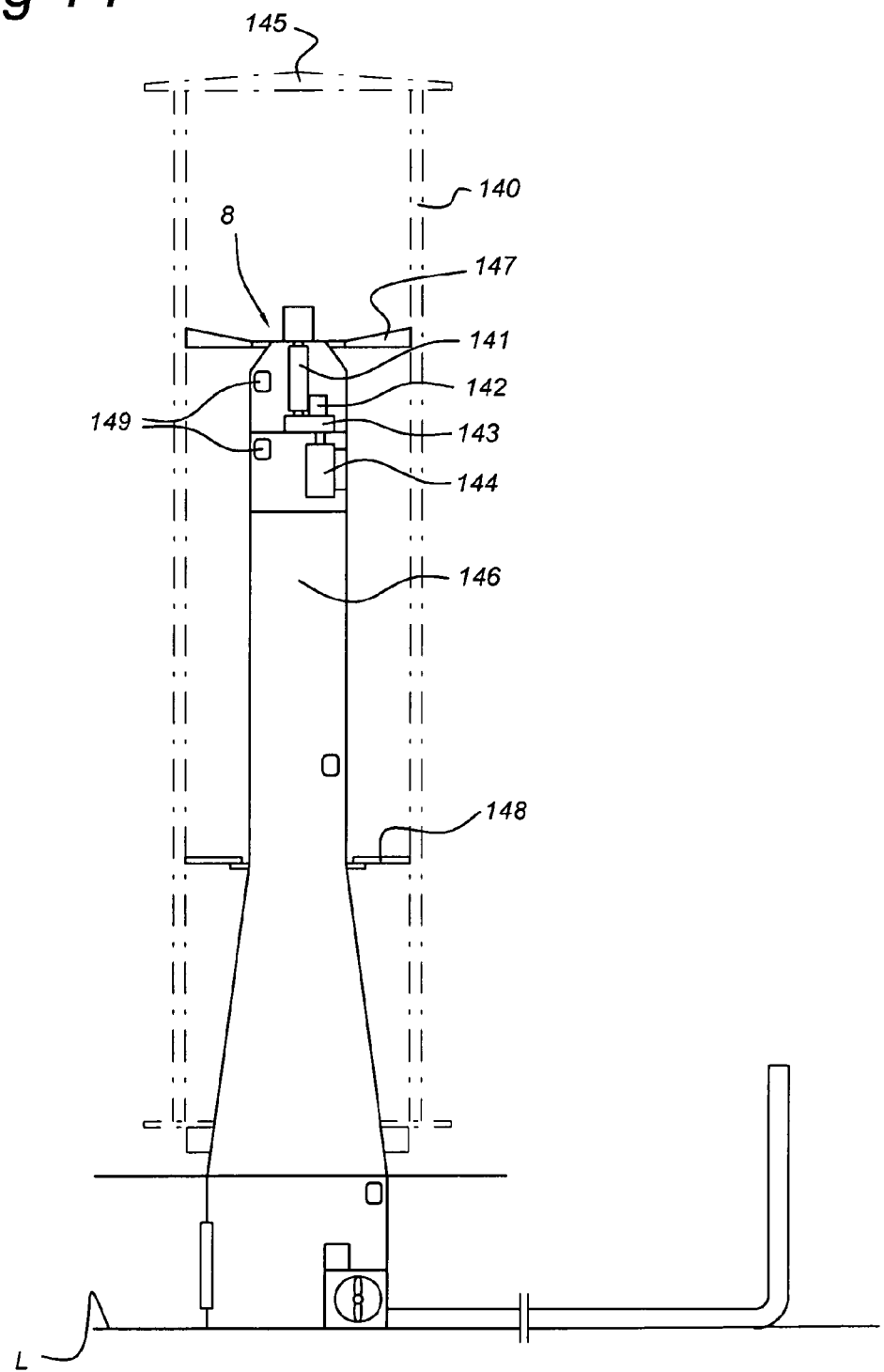
FIG. 14 shows a schematic cross-sectional side view of a rotor with a motor drive inside.

FIG. 13 shows a storage box for storing a rotor. More specifically, FIG. 14 shows a rotor 76 in two positions, an extended position, and a collapsed, horizontal position. The rotor 76 is situated between two cargo compartments. The storage box 104 comprises two clamshell-like halves, or doors, which can be put in an open position, thereby allowing extension of the rotor 76, or which can be put in a closed position, thereby protecting the stored rotor 76 from e.g. sea water, or falling objects, like objects coming down during the loading or unloading of the cargo compartments. The motor drive 8 is also schematically shown inside the cylinder.

FIG. 14 shows a schematic cross-sectional view of a rotor 140 with a motor drive 8 inside. FIG. 14 shows a rotor 140 provided with an end plate 145 on top. The rotor 140 is rotatable around a central mast 146. The motor drive 8 comprises a power transmission part 147. The transmission part 147 is rotatable with respect to the mast 146. The transmission part 147 is connected to a clutch 141. The clutch 141 is connected to a gear box 143. The gear box 143 is connected to the motor 144. The motor 144 can be of any suitable type, for instance an electric motor. The rotor 140 furthermore comprises additional support parts 148. The support parts 148 are rotatable with respect to the central mast 146. The motor 144 is situated at about 15-20 m, for instance 15 m, above base level L. The mast 146 is furthermore provided with maintenance doors 149. The maintenance doors 149 allow for easy access to the inside of the mast 146, for instance to the motor drive 8.

Figure 15:
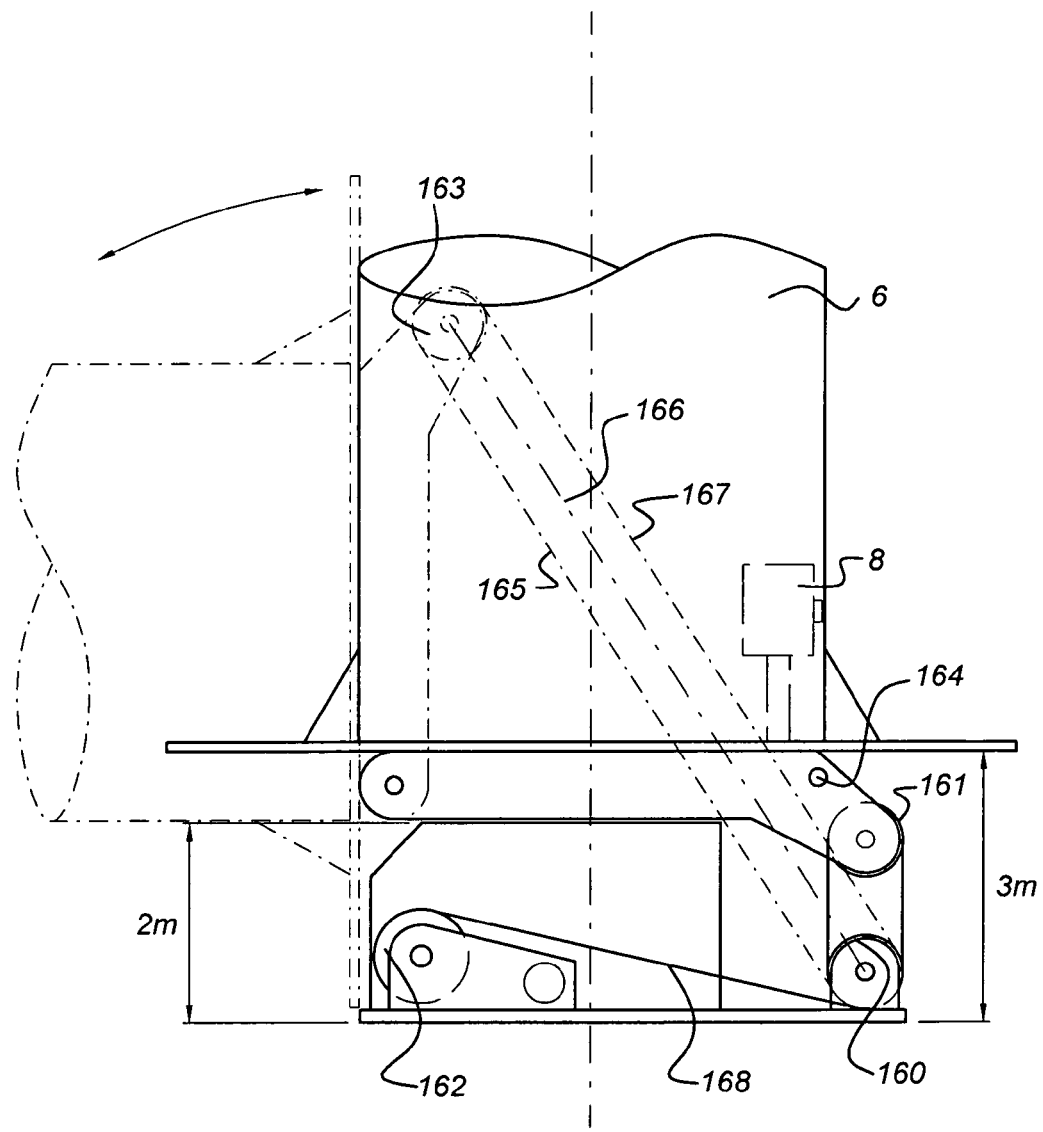
FIG. 15 shows a schematic cross-sectional side view of another rotor lifting mechanism comprising a cable and pulleys.

FIG. 15 shows a schematic cross-sectional side view of another rotor lifting mechanism comprising a cable and pulleys. FIG. 15 shows a hingeable rotor 6 in an upright, operational position. The rotor 6 is provided with a drive motor 8 on the inside. The motor drive 8 as shown is foldable with the rotor 6. The lifting mechanism shows consists of a base plate being attached to and supporting the rotor 6. The base plate and therewith the rotor 6 can be put in an inoperational, folded position and an operational, upright position. The base plate is situated 1-5 m, for instance 2 m as shown in FIG. 15, above deck level. The base plate in this embodiment has a thickness of 0.5 m-2 m, for instance 1 m. The lifting mechanism is used to put the rotor 6 from the inoperational, folded position in the upright position. Thereto, the mechanism is provided with a winch 162 in FIG. 15 housed below the rotor 6. The winch 162 is connected to a cable having a first part 165, a second part 167, and a third part 168. The first and second cable parts 167 and 168 run over a first pulley 160. The second and third cable parts 167 and 165 runs over a second pulley 163. The end of the third cable part 165 is rigidly connected to a part near to the first pulley 160. Upon activation of the winch 162 in counter-clockwise direction the first and second pulley 160 and 163 respectively are drawn towards each other. Upon activation of the winch 162 the inoperational rotor 6 thereby is lifted wherein the rotor 6 is subjected to a clockwise rotation. The motor drive 8 rotates along with the rotor 6. The motor drive 8 can also be positioned outside the rotor 6, wherein it does not rotate along with the rotor 6. The motor drive 8 then reconnects to the rotor 6 after it is rotated from its inoperational to its operational position, for instance reconnecting via a transmission device positioned on the rotor 6's outside. The motor drive can 8 alternatively be positioned outside the rotor 6, wherein it does rotate along with the rotor 6. FIG. 15 furthermore shows locking pins 164 for locking the rotor 6 securely in its upright, operational position.

The invention claimed is:

1. Vessel (1) comprising a hull (3), a propeller (5) for propulsion of the vessel and at least one rotatable cylinder (6) which in its operational state is vertically mounted on the vessel, the cylinder having a rigid outer surface, a motor drive (8) for rotating the cylinder (6) around a longitudinal axis and a displacement member (7) for displacing the cylinder (6) to an inoperational position, characterised in that the motor drive is situated inside the cylinder (6), wherein the cylinder (6) is hingeably connected to the vessel (1) around a substantially horizontal hinge line, wherein the hingeability is established by a rotor support assembly (31) comprising a rotor support frame (32) and a housing (33) hingeably attached to the frame (32) around a transverse axis between a substantially horizontal and a substantially vertical position, the housing (33) supporting the rotatable cylinder (6).

2. Vessel (1) according to claim 1, wherein the vessel (1) is provided with a storage compartment (34) having a length larger than the length of the cylinder (6), the storage compartment (34) being situated on the deck (2) between two cargo compartments (29) for storing the rotor (6) in a longitudinal position (B), the storage compartment (34) being provided with doors for opening and closing the storage compartment (34).

3. Vessel (1) comprising a hull (3), a propeller (5) for propulsion of the vessel and at least one rotatable cylinder (6) which in its operational state is vertically mounted on the vessel, the cylinder having a rigid outer surface, a motor drive (8) for rotating the cylinder (6) around a longitudinal axis and a displacement member (7) for displacing the cylinder (6) to an inoperational position, characterised in that the motor drive is situated inside the cylinder (6), wherein the cylinder (6) is hingeably connected to the vessel (1) around a substantially horizontal hinge line, wherein the vessel (1) is provided with a storage compartment (34) having a length larger than the length of the cylinder (6), the storage compartment (34) being situated on the deck (2) between two cargo compartments (29) for storing the rotor (6) in a longitudinal position (B), the storage compartment (34) being provided with doors for opening and closing the storage compartment (34).

4. Vessel (1) comprising a hull (3), a propeller (5) for propulsion of the vessel and at least one rotatable cylinder (6) which in its operational state is vertically mounted on the vessel, the cylinder having a rigid outer surface, a motor drive (8) for rotating the cylinder (6) around a longitudinal axis and a displacement member (7) for displacing the cylinder (6) to an inoperational position, characterised in that the motor drive is situated inside the cylinder (6), wherein the cylinder comprises two or more telescopically connected tubular segments (9) and an extension member (10) situated along the longitudinal axis, attached to at least one of the segments (9) for raising the segment into an operational state in which the extension member (10) is extended and the segments (9) are overlapping with ring-shaped end parts, and for lowering the segment (9) into an inoperational state in which the extension member (10) is retracted and the segments (9) are nested such that their outer surfaces are overlapping, and wherein the cylinder (6) is hingeably connected to the vessel (1) around a substantially horizontal hinge line.

5. Vessel (1) according to claim 4, wherein the lowermost segment (9) is stationary in the vertical direction, the motor drive (8) being situated at a vertical constant position within the lowermost segment (9).

6. Vessel (1) according to claim 4, wherein the motor drive means (8) is movably connected to a segment to be displaceable in a vertical direction together with the segment by the extension member (10).

7. Vessel (1) comprising a hull (3), a propeller (5) for propulsion of the vessel and at least one rotatable cylinder (6) which in its operational state is vertically mounted on the vessel, the cylinder having a rigid outer surface, a motor drive (8) for rotating the cylinder (6) around a longitudinal axis, and a displacement member (7) for displacing the cylinder (6) to an inoperational state, characterised in that the vessel comprises a transmission device (20) attached to the cylinder and a drive member (8) placed at a distance from the cylinder coupled to the transmission device (20), wherein the cylinder is hingeably connected to the vessel around a substantially horizontal hinge line, the transmission device being hingeable together with the cylinder to from the operational to the inoperational state, and wherein the vessel (1) is provided with a storage compartment (34) having a length larger than the length of the cylinder (6), the storage compartment (34) being situated on the deck (2) between two cargo compartments (29) for storing the rotor (6) in a longitudinal position (B), the storage compartment (34) being provided with doors for opening and closing the storage compartment (34).

8. Vessel (1) according to claim 7, wherein the transmission device (20) is movable with the cylinder from the operational state and detachably coupled to the transmission device (20).

9. Vessel (1) according to claim 7, wherein the cylinder comprises two or more telescopically connected tubular segments (9) and an extension member (10) situated along the longitudinal axis, attached to at least one of the segments (9) for raising the segment into an operational state in which the extension member (10) is extended and the segments (9) are overlapping with ring-shaped end parts, and for lowering the segment (9) into an inoperational state in which the extension member (10) is retracted and the segments (9) are nested such that their outer surfaces are overlapping, the transmission device being attached to at least one of the segments (9) to be vertically displaceable by the extension member (10).

\* \* \* \* \*